Patented July 11, 1933

1,917,311

UNITED STATES PATENT OFFICE

RHYS JENKIN LOVELUCK AND JOHN THOMAS, OF GRANGEMOUTH, SCOTLAND, ASSIGNORS TO SCOTTISH DYES LIMITED, OF GRANGEMOUTH, SCOTLAND

DYESTUFF INTERMEDIATES OF THE BENZOYL-BENZOIC ACID SERIES

No Drawing. Application filed September 9, 1930, Serial No. 480,816, and in Great Britain September 13, 1929.

This invention relates to the production of dyestuff intermediates and more especially to the production of benzoyl-benzoic acid.

It is already known that ortho-dichlor-benzene will condense with phthalic anhydride in the presence of aluminium chloride to give a dichlor-benzoyl-benzoic acid which probably has the constitution 3′: 4′: dichlor-2-benzoyl-benzoic acid.

We have now found that important dyestuff intermediates of the benzoyl-benzoic acid series may be obtained from this dichlor-benzoyl-benzoic acid by treating it with nitrating agents followed, if desired, by reduction.

The primary product is nitro-dichlor-benzoyl-benzoic acid. This, we find, is a very reactive body, probably because of the large number of negative substituents present.

We also find it can be reduced, for example with ferrous sulphate and ammonia to give amino-dichlor-benzoyl-benzoic acid.

The invention in brief consists in treating a dichlor-benzoyl-benzoic acid especially that which may be made by condensation of ortho-dichlor-benzene with phthalic anhydride in the presence of aluminum chloride, with nitrating agents.

The invention also consists in the reduction of products such as may be made by the process of the preceding paragraph, for example, with ferrous sulphate and ammonia.

The invention also consists in processes substantially as herein described and in products when made by those processes or by the obvious chemical equivalents thereof.

The following examples illustrate how the invention may be carried into effect references to parts and to percentages being to parts and percentages by weight:—

Example 1

50 parts of the dichlor-ortho-benzoyl-benzoic acid obtained from ortho-dichlor-benzene are stirred into 250 parts of 97% nitric acid and kept at ordinary temperature for one hour.

The melt is then poured into water and the precipitate filtered off, washed and dried. The weight of product obtained is about 52 parts and contains about 4.6% of nitrogen.

This nitro-product is dissolved in the least quantity of 10% aqueous ammonia and the solution heated to 80° C. 10% ammonia and powdered ferrous sulphate are then added alternately in small amounts, keeping the ammonia in slight excess until the reduction is complete. The whole is then filtered hot, the precipitate of iron salts washed thoroughly with hot water, the filterate well cooled and acidified.

Example 2

This is another example of the nitration of 3′,4′-dichlor-ortho-benzoyl-benzoic acid.

50 parts of 3′,4′-dichloro-ortho-benzoylbenzoic acid are stirred into 400 parts of sulphuric acid monohydrate. A mixture of 11 parts of 98% nitric acid and 100 parts sulphuric acid monohydrate is slowly added and the whole is then heated to 80° C. and maintained for three hours at this temperature, after which it is poured into water. The precipitate is filtered off, washed acid free and dried. It contains 4.51% nitrogen.

Example 3

This is an example of the reduction of the body prepared according to Example 2.

36 parts of nitro-3′, 4′-dichlor-ortho-benzoyl-benzoic acid prepared according to the previous example are milled to a fine paste with 500 parts of water and the paste heated to 75° C. 1 part of sodium chloride is added followed by 48 parts of iron pin dust which is sprinkled in over 12 hours. The mass is stirred for 6 hours or until no nitro-compound remains. 7 parts of sodium carbonate is then stirred in and the whole filtered. The amino-3′,4′-dichlor-ortho-benzoyl-benzoic acid is precipitated from the filtrate by acidifying with hydrochloric acid. This precipitate is filtered, washed acid free and dried.

Having now described our invention, what we claim as new and desire to secure by Letters Patent is:—

1. A process for the preparation of benzoic acid derivatives which consists in mixing the dichlor-ortho-benzoyl-benzoic acid, obtainable by condensing ortho-dichlor-benzene with phthalic anhydride, with about 5 times its weight of concentrated nitric acid kept at the ordinary temperatures for about 1 hour, mixing the melt with a substantial quantity of water and removing the precipitate.

2. Benzoic acid derivatives such as may be made by acting on dichlor-ortho-benzoyl-benzoic acid, obtained by condensing ortho-dichlor-benzene with phthalic anhydride, with concentrated nitric acid.

3. Benzoic acid derivatives such as may be made by treating the condensation product of ortho-dichlor-benzene with phthalic anhydride in the presence of aluminium chloride with a nitrating agent.

4. Benzoic acid derivatives such as may be made by stirring 50 parts of the dichlor-ortho-benzoyl-benzoic acid, obtained by condensing ortho-dichlor-benzene with phthalic anhydride, into 250 parts of 97% nitric acid kept at ordinary temperature for one hour, pouring the melt into water and removing the precipitate.

5. Nitro-3',4'-dichloro-ortho-benzoyl-benzoic acid.

6. Amino-3',4'-dichloro-ortho-benzoyl-benzoic acid.

7. A nitro-3',4'-dichloro-ortho-benzoyl-benzoic acid, substantially identical with the product obtainable by nitrating 3',4'-dichloro-ortho-benzoyl-benzoic acid.

8. An amino-3',4'-dichloro-ortho-benzoyl-benzoic acid, substantially identical with the product obtainable by reducing the product defined in claim 7.

9. A process of producing a benzoyl-benzoic acid derivative, which comprises reacting with a nitrating agent upon 3',4'-dichloro-ortho-benzoyl-benzoic acid.

10. A process of producing a benzoyl-benzoic acid derivative, which comprises reducing the compound obtained by following the process set forth in claim 9.

In testimony whereof we have signed our names to this specification.

RHYS JENKIN LOVELUCK.
JOHN THOMAS.